United States Patent
Youn et al.

(10) Patent No.: US 9,537,334 B2
(45) Date of Patent: Jan. 3, 2017

(54) CHARGING SYSTEM HAVING CIRCUIT FOR DELAYING POWER SUPPLY

(71) Applicant: SPS Inc., Daejeon (KR)

(72) Inventors: Dae-Young Youn, Seoul (KR); Eun-Min Jeon, Daejeon (KR); Jung Gyo Kim, Daejeon (KR); Hyun-Soo Park, Daejeon (KR); Hyun-Jun Kim, Daejeon (KR)

(73) Assignee: SPS Inc., Daejeon (KR)

( * ) Notice: Subject to any disclaimer, the term of this patent is extended or adjusted under 35 U.S.C. 154(b) by 280 days.

(21) Appl. No.: 14/226,479

(22) Filed: Mar. 26, 2014

(65) Prior Publication Data
US 2015/0008869 A1    Jan. 8, 2015

(30) Foreign Application Priority Data
Jul. 2, 2013    (KR) ........................ 10-2013-0077386

(51) Int. Cl.
*H02J 7/00* (2006.01)
(52) U.S. Cl.
CPC ............ *H02J 7/0042* (2013.01); *H02J 7/0029* (2013.01); *H02J 2007/0037* (2013.01)
(58) Field of Classification Search
CPC ............................ H02J 7/00444; H02J 7/0029
USPC .................................................. 320/107, 108
See application file for complete search history.

(56) References Cited

U.S. PATENT DOCUMENTS

| | | | |
|---|---|---|---|
| 7,311,526 B2 | 12/2007 | Rohrbach et al. | |
| 7,517,222 B2 | 4/2009 | Rohrbach et al. | |
| 2006/0261778 A1* | 11/2006 | Elizalde Rodarte | 320/114 |
| 2008/0306417 A1* | 12/2008 | Imboden et al. | 601/134 |
| 2014/0066138 A1* | 3/2014 | Kim et al. | 455/575.1 |
| 2015/0171649 A1* | 6/2015 | Kim et al. | 320/108 |

FOREIGN PATENT DOCUMENTS

| | | | |
|---|---|---|---|
| JP | 2008167916 A | 7/2008 | |
| JP | 2010158126 A | 7/2010 | |
| JP | 2013121238 A | 6/2013 | |

(Continued)

OTHER PUBLICATIONS

Office Action issued on Mar. 10, 2015 for related JP Patent Application No. 2014-131517.

*Primary Examiner* — Suchin Parihar
(74) *Attorney, Agent, or Firm* — Oppedahl Patent Law Firm LLC (57) ABSTRACT

Provided is a charging system having a circuit for delaying power supply, and more particularly, a charging system having a circuit for delaying power supply installed on a side of a power supply apparatus, wherein the circuit for delaying power supply prevents a spark from being generated when an electronic device and the power supply apparatus are connected to each other.

The circuit for delaying power supply blocks the power supply to the Vcc power terminal in the case in which the GND ground power terminal and the D signal terminal are not in an electrically shorted state and releases the blocking of the power supply to the Vcc power terminal because an operation of the transistor is changed and a charging state of the capacitor is changed in the case in which the GND ground power terminal and the D signal terminal become the electrically shorted state.

12 Claims, 6 Drawing Sheets

(56) References Cited

FOREIGN PATENT DOCUMENTS

| | | |
|---|---|---|
| KR | 10-2006-92332 A | 8/2006 |
| KR | 10-1204510 B1 | 11/2012 |
| KR | 10-1267530 B1 | 5/2013 |

* cited by examiner

CHARGING SYSTEM HAVING CIRCUIT FOR DELAYING POWER SUPPLY

CROSS-REFERENCE TO RELATED APPLICATIONS

This application claims priority under 35 U.S.C. §119 to Korean Patent Application No. 10-2013-0077386, filed on Jul. 2, 2013, in the Korean Intellectual Property Office, the disclosure of which is incorporated herein by reference in its entirety.

TECHNICAL FIELD

The following disclosure relates to a charging system having a circuit for delaying power supply, and more particularly, to a charging system having a circuit for delaying power supply installed on a side of a power supply apparatus, wherein the circuit for delaying power supply prevents a spark from being generated when an electronic device and the power supply apparatus are connected to each other in supplying power to the electronic device requiring a supply of a relatively large amount of current.

BACKGROUND

When a power supply apparatus (e.g., an apparatus supplying power to an electronic device, such as an adaptor, or the like) is connected to the electronic device, the power supply apparatus and the electronic device may be connected to each other by a magnetic connector.

Patent Document 1 and Patent Document 2 disclose technologies in which the electronic device and the power supply apparatus are connected to each other by the magnetic connector.

Since the magnetic connector disclosed in Patent Document 1 and Patent Document 2 connects the electronic device and the power supply apparatus to each other in the case in which the electronic device and the power supply apparatus contact only at a specific angle and use a plurality of V+ pin and V− pin having a symmetrical structure, it is not economical. Patent Document 3 discloses a technology in which electrodes of a magnetic connector are concentrically formed so that the electronic device and the power supply apparatus may be electrically connected to each other even in the case in which they are rotated at any angle and contact each other.

However, when the electronic device and the power supply apparatus are connected to each other by the magnetic connector, a spark may be generated in the moment of the connection, may affect the electronic device and the power supply apparatus, and cause a failure. In Patent Document 3, in readiness for a case in which a power supply terminal in the power supply apparatus is electrically shorted, a power delaying circuit unit is installed in the power supply apparatus. However, the invention disclosed in Patent Document 3 is effective in a charging apparatus of a mobile terminal (e.g., a smart phone) consuming a relatively small amount of current, but is not effective in a tablet PC, a notebook computer, and the like consuming a large amount of current.

Patent Document 4 discloses a magnetic connector module including a circuit for blocking power supply. When the circuit for blocking power supply is installed in the power supply apparatus, the spark is decreased in the moment of the connection, but it is not sufficient.

Patent Document 5 discloses a technology allowing power to be supplied to the electronic device after a predetermined time is elapsed when connecting the electronic device and the power supply apparatus to each other by the magnetic connector by installing a circuit for preventing a charging terminal foreign material occurrence on a side of the electronic device. However, a circuit for preventing a spark occurrence may need to be installed on a side of the power supply apparatus, but the circuit for preventing the charging terminal foreign material occurrence may be installed only on a side of the electronic device and may not be installed on a side of the power supply apparatus.

As disclosed in Patent Document 3 or Patent Document 4, in the case in which the electrodes are concentrically formed on a side of the electronic device, since the electrodes on an outer circle are formed to be very long, two pin terminals of V+ and V− on a side of the power supply apparatus may instantaneously contact one electrode, thereby causing overload on a side of the power supply apparatus.

RELATED ART DOCUMENT

Patent Document (Patent Document 1) U.S. Pat. No. 7,311,526 B2 (Dec. 25, 2007.)

(Patent Document 2) U.S. Pat. No. 7,517,222 B2 (Apr. 14, 2009.)

(Patent Document 3) Korean Patent No. KR 10-1204510 B1 (Nov. 19, 2012.)

(Patent Document 4) Korean Patent No. KR 10-1267530 B1 (May 13, 2013.)

(Patent Document 5) Korean Patent Laid-Open Publication No. 10-2006-92332 A (Aug. 23, 2006.)

SUMMARY

An embodiment of the present invention is directed to providing a charging system in which a circuit for preventing a spark from being generated when an electronic device and the power supply apparatus are connected to each other in supplying power to the electronic device requiring a supply of a relatively large current is installed on a side of the power supply apparatus.

Another embodiment of the present invention is directed to providing a charging system preventing a risk of overload generated on a side of a power supply apparatus even in the case in which two pin terminals V+ and V− on a side of the power supply apparatus instantaneously and simultaneously contact one electrode when electrodes are concentrically formed on a side of an electronic device.

In one general aspect, a charging system having a circuit for delaying power supply includes: an electronic device having a pattern electrode concentrically formed thereon and having a magnet of the electronic device; and a charging apparatus having a plurality of pin terminals formed therein and having a magnet of the charging apparatus, wherein the magnet of the electronic device and the magnet of the charging apparatus are magnetically coupled to each other to thereby contact the pattern electrode and the plurality of pin terminals, the plurality of pin terminals include a Vcc power terminal, a GND ground power terminal, and a D signal terminal, the pattern electrode includes a Vcc electrode and a GND electrode, the GND electrode of the pattern electrode is formed of one electrode which is simultaneously in contact with the GND ground power terminal and the D signal terminal, the charging apparatus includes the circuit for delaying power supply, the circuit for delaying power supply includes a transistor and a capacitor, and the circuit for delaying power supply blocks the power supply to the Vcc power terminal in the case in which the GND ground power terminal and the D signal terminal are not in an electrically shorted state and releases the blocking of the power supply to the Vcc power terminal because an operation of the transistor is changed and a charging state of the capacitor is changed in the case in which the GND ground power terminal and the D signal terminal become the electrically shorted state.

In another general aspect, a charging system having a circuit for delaying power supply includes: an electronic device having a pattern electrode concentrically formed thereon and having a magnet of the electronic device; and a charging apparatus having a plurality of pin terminals and a switch formed therein and having a magnet of the charging apparatus, wherein the magnet of the electronic device and the magnet of the charging apparatus are magnetically coupled to each other to thereby contact the pattern electrode and the plurality of pin terminals and press the switch, the plurality of pin terminals include a Vcc power terminal and a GND ground power terminal, the pattern electrode includes a Vcc electrode and a GND electrode, the charging apparatus includes the circuit for delaying power supply, the circuit for delaying power supply includes a transistor and a capacitor, and the circuit for delaying power supply blocks the power supply to the Vcc power terminal in the case in which the switch is not pressed and releases the blocking of the power supply to the Vcc power terminal because an operation of the transistor is changed and a charging state of the capacitor is changed in the case in which the switch is pressed.

The magnet of the electronic device and the magnet of the charging apparatus may have a ring shape.

The electronic device may include an electrode part, the electrode part may include a circular substrate formed of a circular double-sided printed circuit board (PCB), the Vcc electrode and the GND electrode may be formed on a top surface of the circular substrate, two pads may be formed on a bottom surface of the circular substrate and may be connected to lead wires, and the Vcc electrode and the GND electrode may be connected to the two pads through two through-holes formed in the circular substrate.

The charging apparatus may include a body part of the charging apparatus and a pin terminal part.

The circuit for delaying power supply may be installed on the body part of the charging apparatus.

The circuit for delaying power supply may be installed on the pin terminal part.

Other features and aspects will be apparent from the following detailed description, the drawings, and the claims.

[Detailed Description of Main Elements]

| | |
|---|---|
| 100: electronic device | 110: electrode part |
| 111: Vcc electrode | 112: GND electrode |
| 114: circular substrate | 115: magnet of electronic device |
| 116: housing of electrode part | |
| 200: charging apparatus | 210: pin terminal part |
| 211: Vcc power terminal | 212: GND ground power terminal |
| 213: D signal terminal | 214: circuit for delaying power supply |
| 215: magnet of charging apparatus | |
| 216: housing of pin terminal part | |
| 218: switch | 220: body part of charging apparatus |
| 230: cable | |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
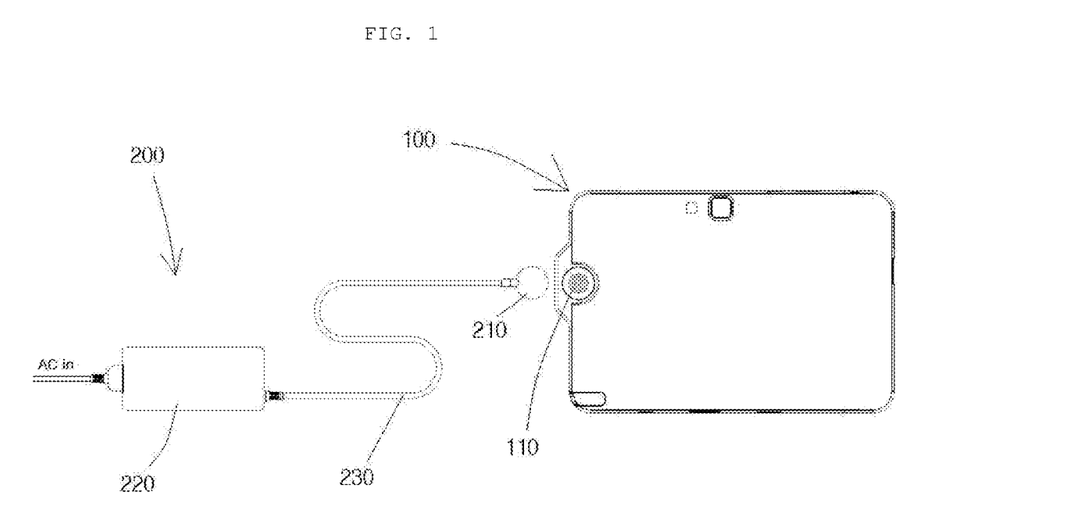
FIG. 1 is a plan view of a charging system according to an exemplary embodiment of the present invention.

FIG. 1 is a plan view of a charging system according to an exemplary embodiment of the present invention.

A charging system according to an exemplary embodiment of the present invention may include an electronic device 100 and a charging apparatus 200. An example of the charging apparatus 200 may include an adaptor. The charging apparatus 100 may include a pin terminal part 210 and a body part 220, wherein the pin terminal part 210 of the charging apparatus and the body part 220 of the charging apparatus may be connected to each other by a cable 230. The electronic device 100 may include an electrode part 110.

A magnet is embedded in the pin terminal part 210 and the electrode part 110, respectively, such that the pin terminal part 210 and the electrode part 110 become contact each other by magnetic force of the magnet. Since a magnetic connector contacting a connecting terminal by the magnetic force of the magnet is a known technology, a detailed description thereof will be omitted.

FIGS. 2A and 2B are perspective views of an electrode part and a pin terminal part according to an exemplary embodiment of the present invention. FIGS. 2A and 2B are perspective views when viewing the electrode part and the pin terminal part at different angles. The perspective views of FIGS. 2A and 2B show a portion of components in a cut state to easily understand an internal structure of the electrode part and the pin terminal part.

The electrode part 110 may include a housing 116 of the electrode part and a circular substrate 114 formed in the housing 116. The circular substrate 114 may have a Vcc electrode 111 and GND electrode 112 formed thereon and the housing 116 of the electrode part may have a magnet 115 of the electronic device installed therein.

Figure 2:
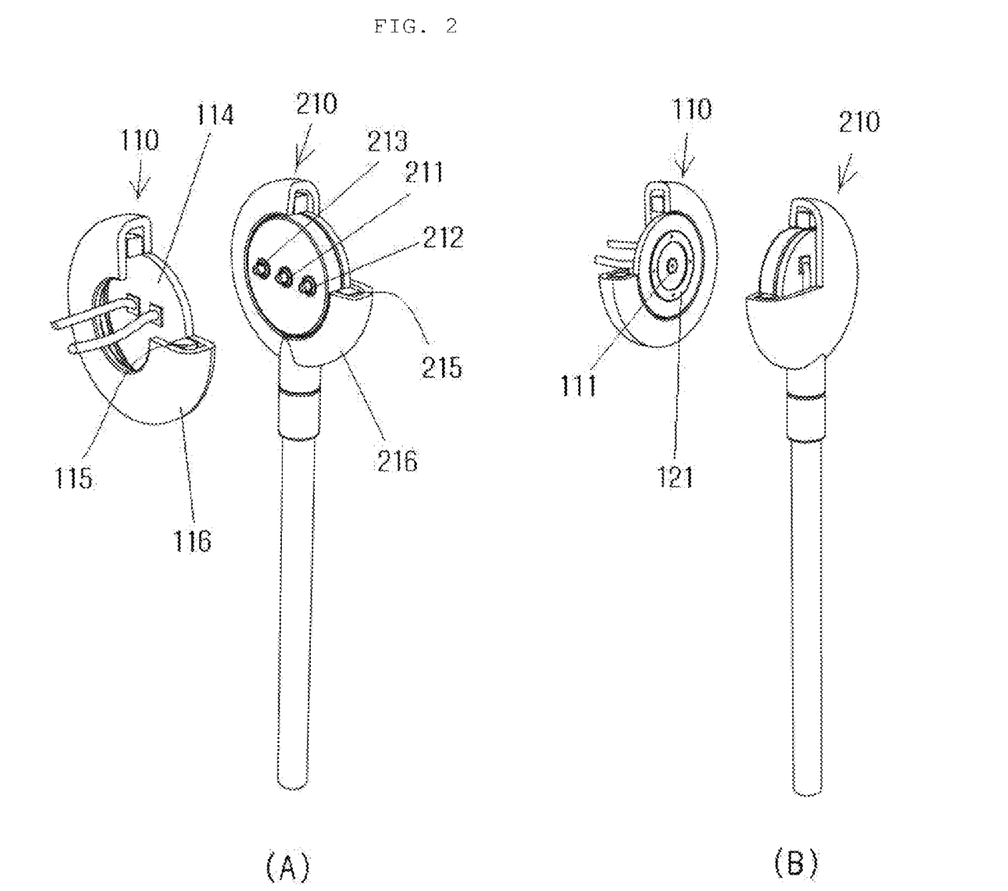
FIGS. 2A and 2B are perspective views of an electrode part and a pin terminal part according to an exemplary embodiment of the present invention.

The Vcc electrode 111 and the GND electrode 112 may be formed in a concentric shape as shown in FIG. 2. As such, a shape in which a plurality of electrode are formed in a predetermined shape is referred to as "pattern electrode" in the present application and the Vcc electrode 111 and the GND electrode 112 may form a pattern electrode having a concentric shape.

The pin terminal part 210 may include a housing 216 of the pin terminal part and a magnet 215 of the charging apparatus may be installed in the housing 216 of the pin terminal part. The pin terminal part 210 may be provided with three pin terminals, that is, a Vcc power terminal 211, a GND ground power terminal 212, and a D signal terminal 213.

The housing 116 of the electrode part and the housing 216 of the pin terminal part may be preferably formed of a nonconductor.

As a method of efficiently manufacturing the electrode part 110, a method in which two lead wires are connected to the Vcc electrode 111 and the GND electrode 112 and a shape is then manufactured by a plastic injection may be contemplated. More preferably, the circular substrate 114 is formed of a circular double-sided printed circuit board, two electrodes are formed on a top surface of the circular substrate 114 and two pads are formed on a bottom surface thereof to be connected to the lead wires, as shown in FIGS. 2A and 2B, and the two electrodes and the two pads are connected to each other through two through-holes on the circular substrate 114, such that the electrode part 110 having a thin thickness and reliability may be cheaply manufactured.

The two electrodes are formed on the top surface of the circular substrate 114 and two lead wires are connected to the two electrodes through the two through-holes on the circular substrate 114, such that the electrode part 110 having a thin thickness and reliability may be cheaply manufactured.

The three pin terminals may be formed of a metal having elasticity to efficiently maintain a contact with the Vcc electrode 111 and the GND electrode 112 of the electrode part 110.

The electrode part 110 and the pin terminal part 210 contact each other by attractive force due to magnetic force between the magnet 115 of the electronic device and the magnet 215 of the charging apparatus. When the electrode part 110 and the pin terminal part 210 contact each other, the Vcc power terminal 211 contacts the Vcc electrode 111 and the GND ground power terminal 212 and the D signal terminal 213 contact the GND electrode 112.

As shown in FIG. 2, in the case in which the magnet 115 of the electronic device and magnet 215 of the charging apparatus are formed in a ring shape, the electrode part 110 and the pin terminal part 210 may contact each other by being rotated at any angle and may be miniaturized to be thinly manufactured.

Figure 3:
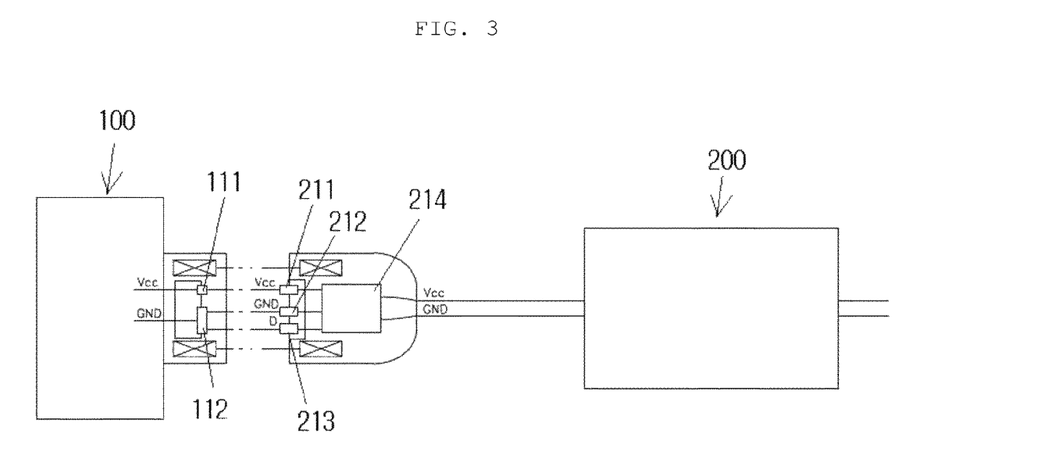
FIG. 3 is a conceptual view of a charging system according to an exemplary embodiment of the present invention.

FIG. 3 is a conceptual view of a charging system according to an exemplary embodiment of the present invention.

The charging system according to an exemplary embodiment of the present invention may be installed with a circuit 214 for delaying power supply.

The circuit 214 for delaying power supply may be installed on the pin terminal part 210, as shown in FIG. 3. However, the circuit 214 for delaying power supply may be installed on the body part 220 of the charging apparatus.

After the GND ground power terminal 212 and the D signal terminal 213 contact the GND electrode 112 to be electrically shorted and a predetermined time is elapsed, the circuit 214 for delaying power supply initiates the power supply to the Vcc power terminal 211 and the GND ground power terminal 212.

The circuit 214 for delaying power supply may be implemented by various methods.

Figure 4:
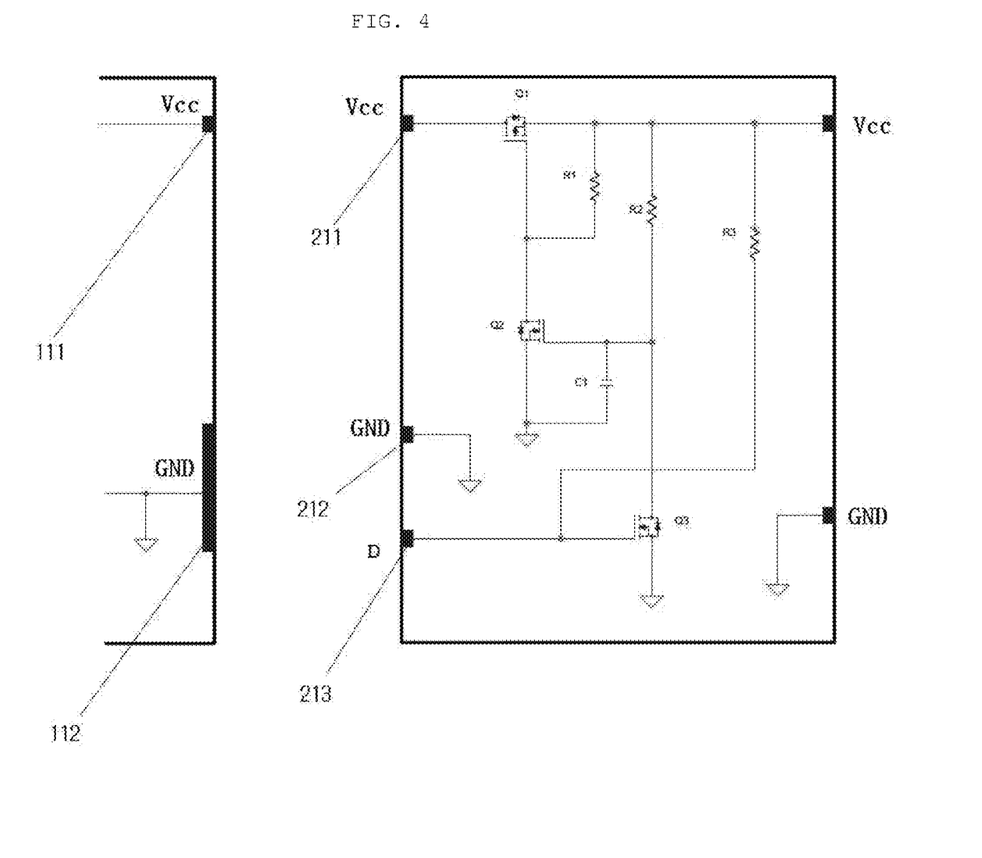
FIG. 4 shows an example of a circuit for delaying power supply according to an exemplary embodiment of the present invention.

FIG. 4 shows an example of a circuit for delaying power supply according to an exemplary embodiment of the present invention.

In a state in which the electrode part 110 and the pin terminal part 120 do not contact each other, a Q3 gate becomes "H" state, such that the Q3 becomes a turn-on state. In this case, a Q2 becomes a turn-off state and a main switch Q1 becomes a turn-off state, such that a Vcc output is not output.

If the electrode part 110 and the pin terminal part 120 normally contact each other, an input state of the D signal terminal 213 may be changed from No connection (N/C) to GND. In this case, the Q3 gate becomes "L" state and the Q3 becomes the turn-off state, a capacitor C1 may be charged through a path of a resistor R2 and the C1. When a predetermined time is elapsed, the C1 is charged up to a predetermined level or more, such that the Q2 becomes the turn-on state and the main switch Q1 also becomes the turn-on state, thereby outputting the Vcc output. In this case, a delay time may be adjusted by values the R2 and C1.

Figure 5:
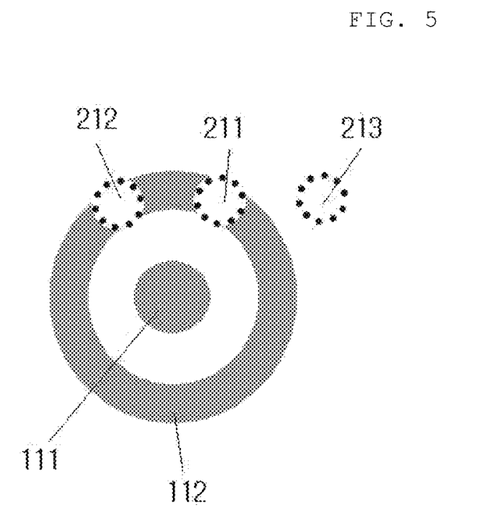
FIG. 5 shows a shape in which a Vcc power terminal and a GND ground power terminal contact one electrode.

FIG. 5 shows a shape in which a Vcc power terminal and a GND ground power terminal contact one electrode. That is, before the electrode part 110 and the pin terminal part 120 normally contact each other, the Vcc power terminal 211 and the GND ground power terminal 212 may instantaneously contact the GND electrode 112. If so, in the case in which the circuit 214 for delaying power supply and the D signal terminal 213 are not present, a spark may be generated and damage to the apparatus may be caused. However, according to the present invention, since the circuit 214 for delaying power supply and the D signal terminal 213 block the power supply, the spark is not generated.

Figure 6:
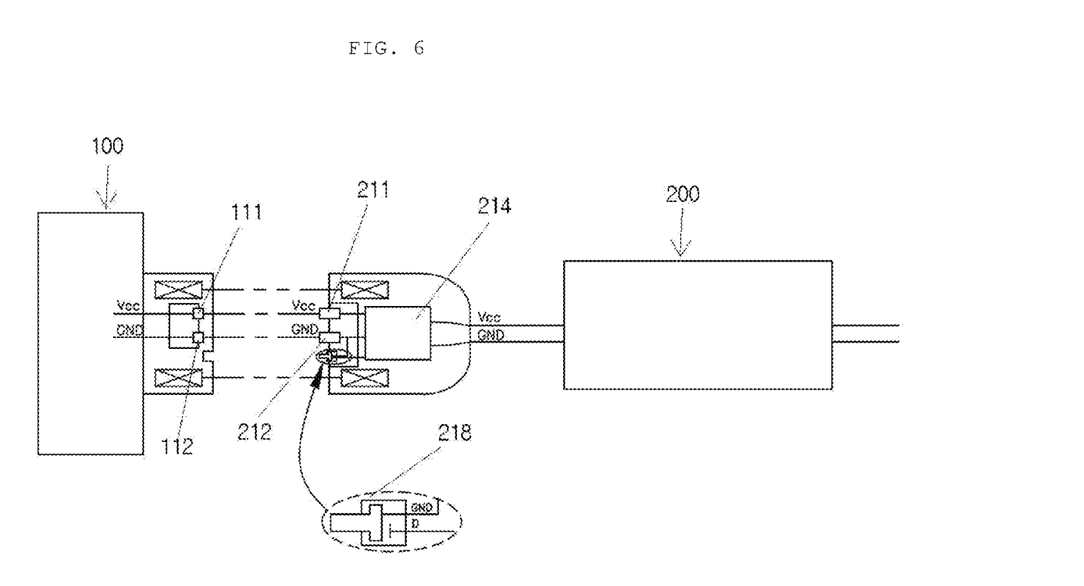
FIG. 6 is a conceptual view of a charging system according to another exemplary embodiment of the present invention.

FIG. 6 is a conceptual view of a charging system according to another exemplary embodiment of the present invention.

According to an exemplary embodiment of the present invention shown in FIG. 6, the pint terminal part 210 may have a switch 218 which is formed instead of the D signal terminal 213. The switch 218 may be pressed when the magnet of the electronic device and the magnet of the charging apparatus are magnetically coupled, and may connect a D input of the circuit for delaying power supply and a ground input GND to each other only in the pressed state.

If the switch 218 is not pressed, the D input of the circuit of delaying power supply becomes the no connection (N/C) state, such that the circuit for delaying power supply may block the power supply. If the switch 218 is pressed, the D input of the circuit for delaying power supply is connected the ground input (GND), such that the block of the power supply may be released after a predetermined time is elapsed.

As in an exemplary embodiment of the present invention shown in FIG. 6, if the switch 218 is formed instead of the D signal terminal 213, an exposed portion of the switch 218 may be formed of not a metal but a plastic which is a nonconductor, and since the switch 218 may be installed at any portion as well as a portion corresponding to the GND electrode 112, it may be more stably formed while having a small size. In addition, in the case in which a groove is formed at a corresponding portion of the electrode part 110 to which a button (key) of the switch 218 contacts, since power is output only when the contacting position precisely matches the groove, a more safe magnetic connector may be provided.

According to the embodiment of the present invention, in the charging system having the circuit for delaying power supply configured as described above, when supplying power to the electronic device requiring the supply of the relatively large amount of current, the circuit for preventing the spark occurrence when the electronic device and the power supply apparatus are connected to each other may be installed on the side of the power supply apparatus.

In addition, when electrodes are concentrically formed on a side of an electronic device, even in the case in which two pin terminals V+ and V− on the side of the power supply apparatus instantaneously and simultaneously contact one electrode, the risk of the overload generated on the side of a power supply apparatus may be prevented.

What is claimed is:

1. A charging system having a circuit for delaying power supply, the charging system comprising:
   an electronic device having a pattern electrode concentrically formed thereon and having a magnet of the electronic device; and
   a charging apparatus having a plurality of pin terminals formed therein and having a magnet of the charging apparatus,
   wherein the magnet of the electronic device and the magnet of the charging apparatus are magnetically coupled to each other to thereby contact the pattern electrode and the plurality of pin terminals,
   the plurality of pin terminal includes a Vcc power terminal, a GND ground power terminal, and a D signal terminal,
   the pattern electrode includes a Vcc electrode and a GND electrode,
   the GND electrode of the pattern electrode is formed of one electrode which is simultaneously in contact with the GND ground power terminal and the D signal terminal,
   the charging apparatus includes the circuit for delaying power supply,
   the circuit for delaying power supply includes a transistor and a capacitor, and
   the circuit for delaying power supply blocks the power supply to the Vcc power terminal in the case in which the GND ground power terminal and the D signal terminal are not simultaneously in contact with the GND electrode and releases the blocking of the power supply to the Vcc power terminal because an operation of the transistor is changed and a charging state of the capacitor is changed in the case in which the GND ground power terminal and the D signal terminal are simultaneously in contact with the GND electrode.

2. The charging system of claim 1, wherein the magnet of the electronic device and the magnet of the charging apparatus have a ring shape.

3. The charging system of claim 1, wherein the electronic device includes an electrode part,
   the electrode part includes a circular substrate formed of a circular double-sided printed circuit board (PCB),
   the Vcc electrode and the GND electrode are formed on a top surface of the circular substrate,
   two pads are formed on a bottom surface of the circular substrate and are connected to lead wires, and
   the Vcc electrode and the GND electrode are connected to the two pads through two through-holes formed in the circular substrate.

4. The charging system of claim 1, wherein the charging apparatus includes a body part of the charging apparatus and a pin terminal part.

5. The charging system of claim 4, wherein the circuit for delaying power supply is installed on the body part of the charging apparatus.

6. The charging system of claim 4, wherein the circuit for delaying power supply is installed on the pin terminal part.

7. A charging system having a circuit for delaying power supply, the charging system comprising:
   an electronic device having a pattern electrode concentrically formed thereon and having a magnet of the electronic device; and
   a charging apparatus having a plurality of pin terminals and a switch formed therein and having a magnet of the charging apparatus,
   wherein the magnet of the electronic device and the magnet of the charging apparatus are magnetically coupled to each other to thereby contact the pattern electrode and the plurality of pin terminals and press the switch,
   the plurality of pin terminals include a Vcc power terminal and a GND ground power terminal,
   the pattern electrode includes a Vcc electrode and a GND electrode,
   the charging apparatus includes the circuit for delaying power supply,
   the circuit for delaying power supply includes a transistor and a capacitor, and
   the circuit for delaying power supply blocks the power supply to the Vcc power terminal in the case in which the switch is not pressed and releases the blocking of the power supply to the Vcc power terminal because an operation of the transistor is changed and a charging state of the capacitor is changed in the case in which the switch is pressed.

8. The charging system of claim 7, wherein the magnet of the electronic device and the magnet of the charging apparatus have a ring shape.

9. The charging system of claim 7, wherein the electronic device includes an electrode part,
   the electrode part includes a circular substrate formed of a circular double-sided printed circuit board (PCB),
   the Vcc electrode and the GND electrode are formed on a top surface of the circular substrate,
   two pads are formed on a bottom surface of the circular substrate and are connected to lead wires, and
   the Vcc electrode and the GND electrode are connected to the two pads through two through-holes formed in the circular substrate.

10. The charging system of claim 7, wherein the charging apparatus includes a body part of the charging apparatus and a pin terminal part.

11. The charging system of claim 10, wherein the circuit for delaying power supply is installed on the body part of the charging apparatus.

12. The charging system of claim 10, wherein the circuit for delaying power supply is installed on the pin terminal part.

\* \* \* \* \*